April 20, 1954    T. C. VAN DEGRIFT ET AL    2,675,700
TORQUEMETER

Filed Aug. 20, 1949    3 Sheets-Sheet 1

Inventors
Thomas C. Van Degrift &
William F. King
By
Spencer Willito, Helwig & Baillio
Attorneys April 20, 1954  T. C. VAN DEGRIFT ET AL  2,675,700
TORQUEMETER
Filed Aug. 20, 1949  3 Sheets-Sheet 2
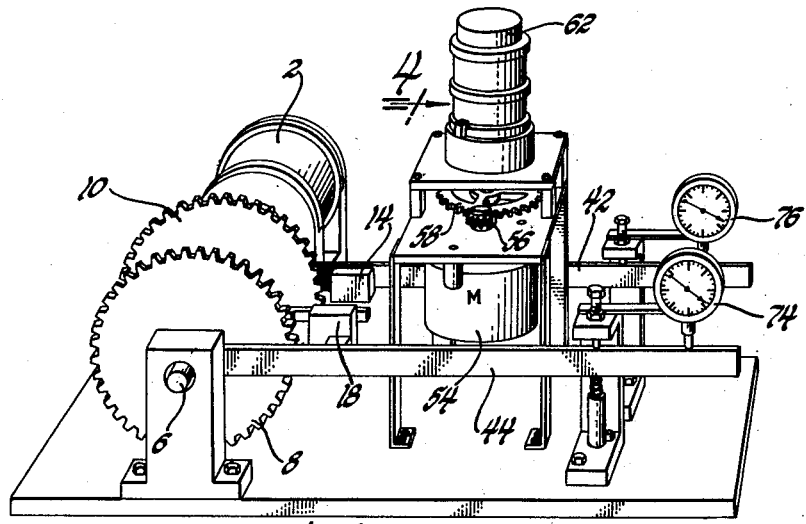
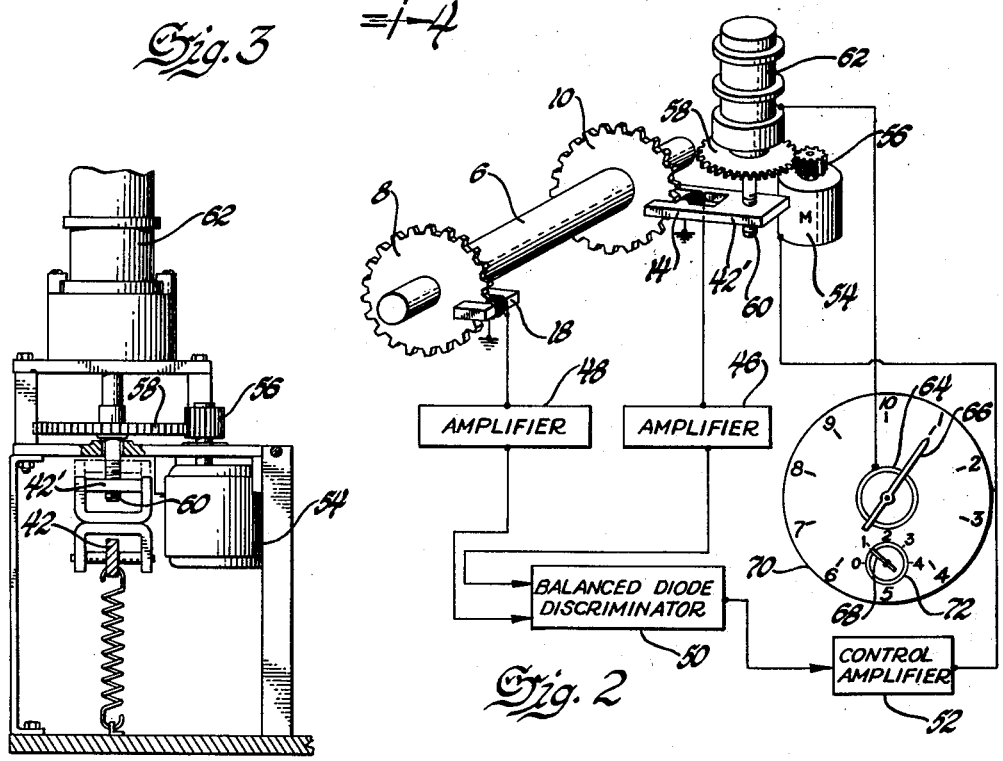
Inventors
Thomas C. Van Degrift &
William F. King
By
Spencer, Willits, Helwig
Attorneys April 20, 1954  T. C. VAN DEGRIFT ET AL  2,675,700
TORQUEMETER Filed Aug. 20, 1949  3 Sheets-Sheet 3

Inventors
Thomas C. Van Degrift &
William F. King
By
Spencer, Willis, Helwig & Baillio
Attorneys Patented Apr. 20, 1954

2,675,700

UNITED STATES PATENT OFFICE 2,675,700

TORQUEMETER

Thomas C. Van Degrift, Detroit, and William F. King, Royal Oak, Mich., assignors to General Motors Corporation, Detroit, Mich., a corporation of Delaware Application August 20, 1949, Serial No. 111,454

4 Claims. (Cl. 73—136)

The present invention relates to torque-measuring devices for rotating shafts. More particularly it relates to torque-measuring devices which have associated electronic null indicating means.

It is quite desirable in measuring and indicating torque that the measuring instrument not exert additional torque on the member and thereby give false readings. It is also quite desirable that the instrument not require the transmission of electrical energy from a rotating member to a stationary indicating device through electrical contacts. Certain electrical phase shift measuring devices are not linear and frequently do not retain their torque response calibration characteristics.

It is therefore an object of the present invention to design a simple and effective means to measure the torque transmitted by rotating members.

It is a further object of the present invention to provide a torque-measuring apparatus for rotating members in which the electrical errors of the system are cancelled out.

It is a further object of the present invention to provide an automatic servo mechanism capable of adjusting the null position of the torque-measuring device to eliminate electrical errors.

Other objects of the present invention will become apparent upon inspection of the drawings and reading of the specification and will be specifically pointed out in the claims.

Referring to figures in the drawings,

Figure 2 is a schematic diagram showing a second modification of the present invention.

Figures 3 and 4 show the mechanical construction of the second modification of the present invention.

This invention embraces means for measuring the torque being transmitted through a shaft by measuring the angular windup between two spaced planes on that shaft. In utilizing this invention the rotating member of an alternator is mounted at each of the two reference planes on the shaft. The stator or pickup coil of one of the generators is fixed while the other stator or pickup coil is movable arcuately about the center of the shaft. The output of the two generators is connected in series to a meter in one modification of this invention and to a servo mechanism in another modification of this invention. In the modification shown in Figure 1, the outputs are connected in opposing phase to cancel each other to give a minimum reading or if desired, may be connected in aiding phase to give a maximum reading at equilibrium conditions. The movable pickup coils of the one alternator are adjusted about its pivot so that the meter gives a minimum (or a maximum reading as desired) when no torque is being transmitted. The shaft is then placed under torque and the movable pickup coils are readjusted so as to give the initial reading (either minimum or maximum as was present when the shaft was under zero torque). The relative displacement of the movable pickup coils will then be the same as the torsional windup between the two alternator rotating members. This system may be used quite advantageously in measuring the torque of high speed shafts where the weight of the parts attached to the shaft must be kept to a minimum.

Figure 1:
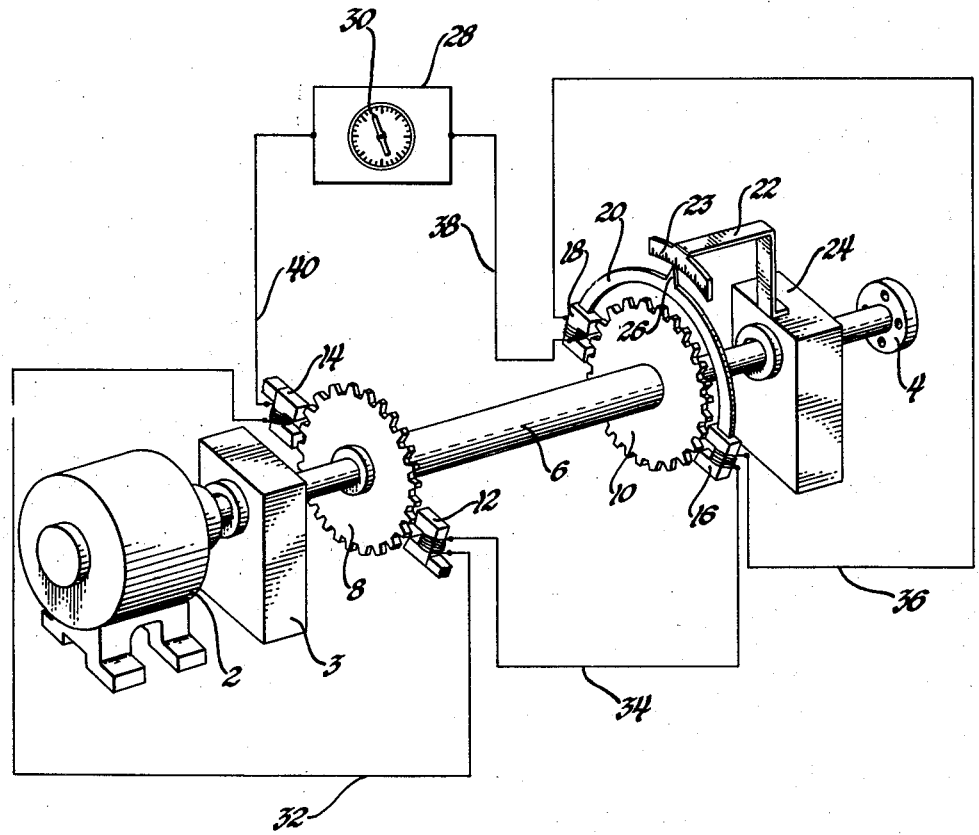
Figure 1 shows one modification of the present invention.

Description of Figure 1

Referring now more particularly to the modification shown in Figure 1, 2 represents a source of power and 4 the load being driven by the power source. It is desired to know the torque being transmitted between this power source and load. 3 and 24 are bearing brackets rigidly mounted to the base of the machine. A shaft 6 of known torque stress-strain characteristics is placed between the load 4 and power source 2. It has two gears 8 and 10 with equal number of teeth rigidly mounted to said shaft in spaced planes. The number of teeth on these gears is correlated with the torque stress-strain characteristics of the shaft 6 so that the desired phase shift is attained for the range of torque being measured. Pickup coils 12 and 14 are so positioned with regard to the teeth on the gear 8 that they generate an alternating current of the same frequency as the rate of tooth passage or a frequency equal to the rate of rotation of the shaft multiplied by the number of teeth on gear 8. Pickup coils 12 and 14 are held in a fixed position. The pickup coils 16 and 18 are positioned relative to the teeth on the gear 10 in much the same manner as are the pickup coils 12 and 14 with regard to the gear 8 above mentioned. The coils 16 and 18 are attached to a carrier 20 which is movable about a pivot point coinciding with the axis of rotation of the shaft 6. This carrier 20 has a pointer 26 located thereon adjacent the graduations 23 on a scale member 22 rigidly attached to bearing bracket 24. With such an arrangement the pickup coils 16 and 18 may be moved about the center of rotation of the shaft 6 and the angularity of such movement measured by noting the graduations 23. This scale may be graduated to show angularity of windup but in one modification it is found most convenient to graduate it in units of torque. In order to determine the minimum or maximum voltage output of the combined pickup coils, an ammeter 28 having dial 30 is provided. It is quite necessary that this meter be very sensitive but the graduations on the dial 30 need not be in any particular units since this meter is used only as a null or maximum current indicating device. The pickup coils 12 and 14 are connected in series by the conductor 32 as are the pickup coils 16 and 18 by the conductor 36. The series circuit including these two pairs of pickup coils and the meter is completed by the conductor 34 connecting the coils 12 and 16, the conductor 38 connecting the coil 18 to the meter 28 and the conductor 40 connecting the coil 14 to the meter 28. The particular circuit connections of conductors 34, 38 and 40 may be rearranged for either opposing phase or aiding phase connection of the pickup coils depending upon the desire of the operator.

Operation of Figure 1

In utilizing the torque-measuring device shown in Figure 1, the operator first starts the power plant 2 and brings it up to speed with no load at the output 4. He then adjusts the carrier 20 for either minimum or maximum reading of the meter 28. For sake of simplicity, we will hereafter consider utilization of this device as being a minimum current indicating device. The position of the pointer 26 on the scale 23 at the point of minimum current or null point is the zero set of the device and will not need to be changed during the life of the machine. The load 4 is then attached and the power plant 2 brought up to operating speed. The torque being transmitted through the shaft 6 causes the shaft to twist resulting in a phase displacement between the gears 8 and 10. This phase displacement results in the alternating current signal being produced by the pickups 12 and 14 being no longer 180° out of phase with that produced by the coils 16 and 18 and therefore the sum of these two signals ceases to be zero. The operator then observes the dial 30 of the meter 28 and readjusts the carrier 20 to obtain a minimum or zero reading. Then the operator observes the torque being transmitted by the shaft on the scale 23. The movement of the carrier 20 of course may be by manual or by other mechanical or electrical means and in the second modification of the present invention this means is automatic.

Description of Figures 2, 3 and 4

Referring now to Figures 2, 3 and 4 an automatic version of the present invention is illustrated. Figure 2 shows a schematic diagram of this version. In this modification three pickup coils at each end of the shaft are utilized. For convenience we have selected coils 14 and 18. The signals generated by the coils 14 and 18 are amplified by amplifiers 46 and 48 respectively and are then fed into a balanced diode discriminator 50. This discriminator is of the standard phase discriminator type in which the output signal produced is proportional in amplitude to the phase deviation from the balance position of 90° phasing. This output signal from the discriminator 50 is fed into a control amplifier 52 which generates sufficient power in response to its input signal to actuate the motor 54. The motor 54 by means of gears 56 and 58 drives a lead screw 60 which is threaded into the member 42' supporting the coil 14. The gear 58 is also attached to a synchro transmitter 62. The synchro transmitter 62 may be of the single speed or two speed conventional type. The signal from this transmitter 62 is fed to a synchro receiver 64 which has a single speed pointer 66 attached thereto and a second pointer 68 geared thereto. The pointer 66 indicates displacement of the pickup 14 from its initial position and therefore the graduations on the scale 70 may be in units of torque. The scale 72 is a tens scale, the pointer 68 moving one division for each revolution of the pointer 66. In order to provide extremely accurate measurement for low torque, we have provided displacement measuring indicators 74 and 76. These indicators measure the angular movement of the members 44 and 42 respectively. In this modification of the invention the members 44 and 42 are pivoted about the shaft 6 so that their movement is a measurement of the torsional windup of the member 6 while it is carrying torque.

Operation of Figures 2, 3 and 4

The operation of the second modification of the present invention shown in Figures 2, 3 and 4 is as follows. The operator starts the motor 2 under no load conditions and makes such mechanical adjustments of the pickup 14 as are necessary to zero the output of the diode discriminator 50. Under these conditions the pointers 66 and 68 should both read zero. Upon applying load the shaft 6 is subjected to torsional strain thus causing the output signals from the pickups 14 and 18 to deviate from phase balance. These signals are amplified by amplifiers 46 and 48 respectively and then introduced to diode discriminator 50. The output of this discriminator is no longer zero under out of balance input conditions and a signal is transmitted to the control amplifier 52. The control amplifier energizes the motor 54 and thereby readjusts the pickup 14 through gears 56 and 58 and lead screw 60 so that the output from this pickup is again in phase balance with the output from the pickup 18. The synchro transmitter 62 is simultaneously indexed with the movement of pickup 14 and transmits a displacement signal to the receiver 64. The amount of displacement may then be read by noting the position of the pointers 66 and 68 on the scales 70 and 72 respectively. This displacement signal is a direct function of the torsional deformation of the shaft 6 and hence may be calibrated to give an indication of the torque being transmitted thereby.

Figure 5:
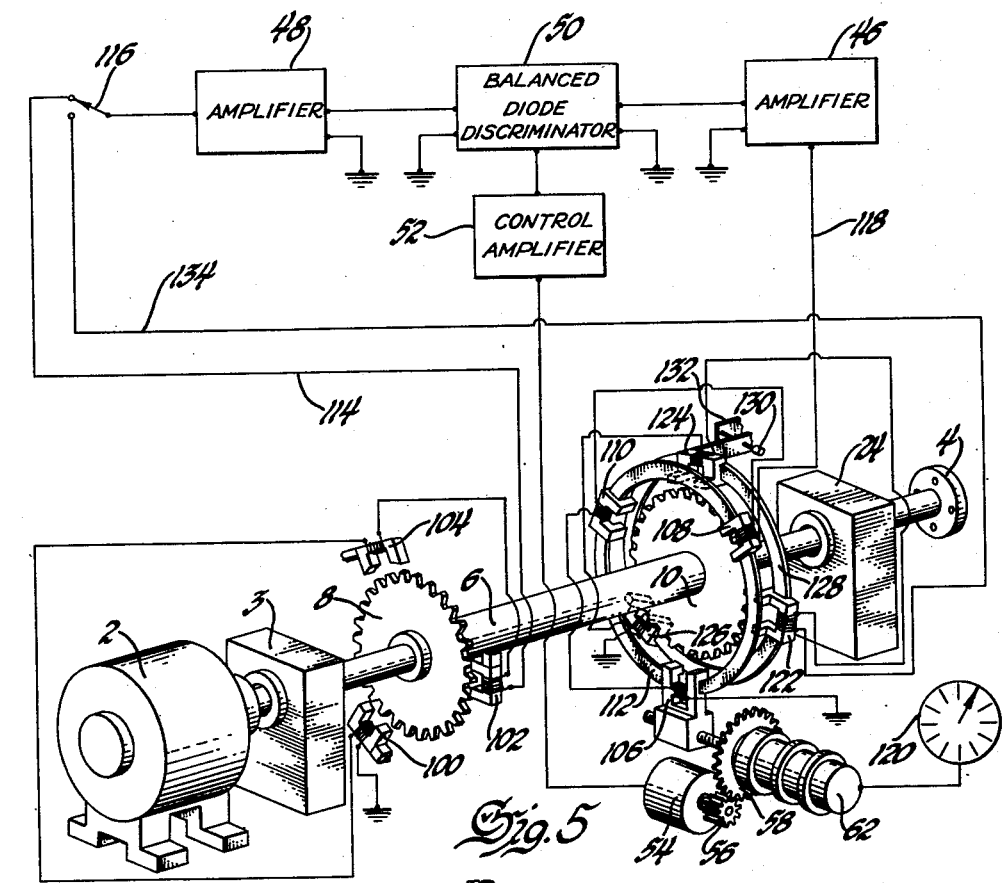
Figure 5 shows a further modification of the present invention with means for checking the follow-up system.

Description of Figure 5

Another modification of the present invention is shown in Figure 5. Here as in the preceding modifications the prime mover 2 drives a load 4 through a rotatable shaft 6 having known torsional deflection characteristics. Here as in the preceding modifications this shaft has pickup gears 8 and 10 which are mounted a fixed axial distance apart and the torsional windup of the shaft 6 between these two gears is measured to thereby determine the torque being transmitted. In the present modification three magnetic pickups equidistantly spaced around the gears are utilized. By thus spacing the magnetic pickups spurious signals due to radial wobble of the gears are minimized. In this modification the pickups 100, 102 and 104 are connected in aiding phase to produce a reference signal. The gear 10 has mounted thereon two sets of pickups. One of these sets of pickups is utilized to produce a signal whose phase displacement from the reference signal is a function of the torque transmitted. These pickups 106, 108 and 110 are all rigidly mounted on a ring 112 and are simultaneously adjusted in their tangential position by means of motor 54 and reduction gears 56 and 58. The signal from the reference pickups 100, 102 and 104 is fed through conductor 114 through switch 116 to amplifier 48. The amplified signal is then fed into one side of the phase responsive discriminator 50. The signal from the pickups 106, 108 and 110 is fed by conductor 118 to amplifier 46. This signal is amplified and then fed into the opposite side of the discriminator 50. If these two signals are in phase balance, the output of the discriminator is zero voltage. If the two signals are not in phase balance, the D. C. output of the discriminator is a function of the deviation from phase balance of the two signals. The output voltage from the discriminator 50 is amplified by the control amplifier 52 and used to drive the reversible motor 54. Thus this modification of the present invention, similar to the previous modification shown in Figures 2 through 4, produces a voltage at the motor 54 which is a function of the phase relationship between the signals produced by the pickup gears 8 and 10. The motor 54 is thereby energized so that it indexes the pickups 106, 108 and 110 so that their output is again in phase balance with the output of the pickups 100, 102 and 104. The amount of movement necessary to produce this readjustment is shown on torque indicator 120. The Selsyn transmitter 62 is mechanically indexed to produce a signal which the Selsyn receiver (torque indicator 120) follows to indicate the windup of the shaft 6.

It is desirable in apparatus of this type to provide a means for checking the operation of the follow-up system. In the present system such a checking means is produced by providing a set of pickups 122, 124 and 126. These pickups operate on the same gear as do pickups 106, 108 and 110, namely, gear 10. The signal from these three pickups may by proper closing of the switch 116 be fed through conductor 134 to the amplifier 48. This signal may be compared with the signal from the pickups 106, 108 and 110 by means of discriminator 50. Pickups 122, 124 and 126 are carried by a ring member 128 which may be adjusted by means of adjusting screw 130 operating against a fixed stop member 132. This adjustment is performed to obtain the same reading on indicator 120 using pickups 122, 124 and 126 as is obtained using pickups 100, 102 and 104 under no torque conditions. Since the pickups 122, 124 and 126 operate on the same gear 10 as do the moving pickups 106, 108 and 110 the reading on indicator 120 with the switch 116 on the lower contact is a zero torque reference which may be checked at any time even while torque is being transmitted by shaft 6. Any deviation from a zero reading in this position will also be present as a deviation from the true torque when switch 116 is in the upper position. The torquemeter reading can thus be corrected for drifting or instability of the electronic equipment.

Operation of Figure 5

The operator first starts up the prime mover or electric motor 2 and brings it up to the desired speed. He may then check the follow-up system by placing the switch 116 on the lower contact and taking a reading on the torque indicator 120. If this reading is zero, the follow-up system is working properly. The operator then places the switch 116 in the position shown in the drawing. When the switch is in this position, the output signal from the fixed position pickups 100, 102 and 104 is amplified and impressed on one side of the discriminator 50. The signal generated by the gear 10 is amplified and impressed upon the other side of the discriminator 50. The output signal from this discriminator causes the motor 54 to move the ring 112 carrying pickups 106, 108 and 110 arcuately so that the signal produced by these pickups is again in phase balance with the output from pickups 100, 102 and 104 and the amount of movement to rezero the system and hence the amount of torque being transmitted is indicated on the indicator 120. The output from the discriminator 50 is of polarity plus or minus depending upon whether the signal from the amplifier 46 is leading or lagging the signal from the amplifier 48. The direction of rotation of the motor 54 is clockwise or counter-clockwise depending upon the polarity of the signal it receives. It may thus be seen that the indicator 120 may be made to follow a varying torque characteristic so long as those variations are of such characteristics as may be followed by the follow-up system.

Figure 6:
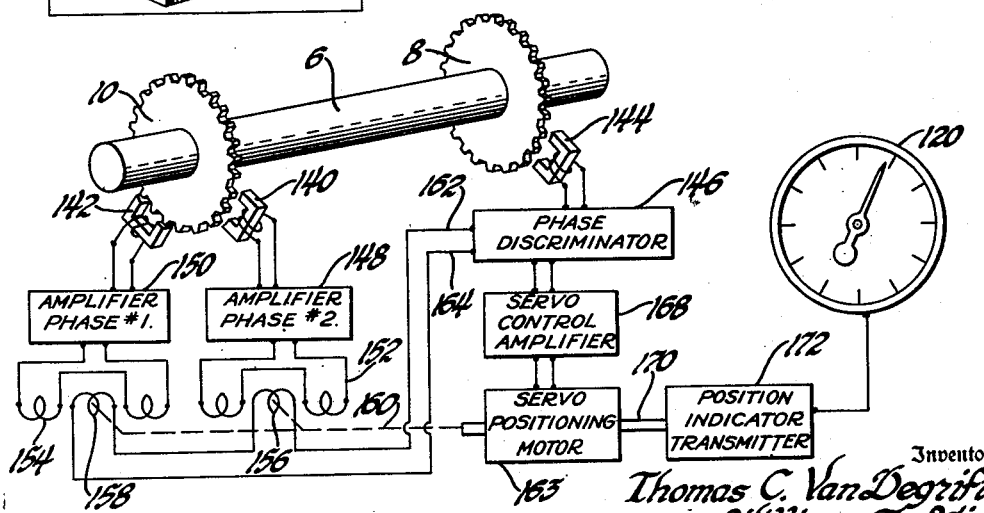
Figure 6 shows a still further modification of the present invention utilizing Helmholtz coils.

Description of Figure 6

Referring to Figure 6, another modification of the present invention is illustrated. In this modification the same gears 8 and 10 with connecting torsional element 6 are utilized as in previously described modifications. This system however uses two Helmholtz coil assemblies having search coils therein and balances the system by re-orienting the search coils so as to obtain a signal which is in phase balance with the reference signal. In this system a reference signal is produced by the pickup coil or coils 144 and fed into the phase discriminator 146. The torque responsive voltage is picked up by search coils 140 and 142. The outputs from the coils 140 and 142 are displaced from each other by a phase of 90 electrical degrees. The output signals from pickups 140 and 142 are amplified separately by amplifiers 148 and 150 respectively. The output of the amplifiers 148 and 150 is used to energize the Helmholtz coil assemblies 152 and 154 respectively. The coil assemblies 152 and 154 have mounted therein search coils 156 and 158 respectively. These search coils are mounted so as to be rotated by shaft 160 driven by servo positioning motor 163. By connecting the coils 156 and 158 in series it is possible to produce an output signal which is responsive throughout 360 electrical degrees to the combined effect of the movement of shaft 160 and the angular relationship between the gears 8 and 10. The output signal thus produced in the conductors 162 and 164 is fed into the phase discriminator 146 where it is compared with the signal produced by the pickup 144. The output of this phase discriminator is proportional in amplitude to the deviation from phase balance between the signal produced by the pickup 144 and that impressed by the conductors 162 and 164 and therefore is proportional to the angular relationship between the gears 8 and 10. The polarity of this output is plus or minus depending on whether the signal from the pickup 144 is leading or lagging the phase balance condition of that signal impressed by the conductors 162 and 164. This output signal is amplified by the servo control amplifier 168 to energize the servo positioning motor 163. The motor 163 is a reversible type motor which rotates either clockwise or counter-clockwise depending upon the polarity of the impressed signal. Its rotor is attached to the shaft 160 and an extension thereof 170, which drive the search coil assemblies and the position indicator transmitter 172 respectively. The movement of the transmitter 172 is electrically conducted to the torque indicator 120. The shaft 160 drives the search coils 156 and 158 to a new position so that their combined output is in phase balance with the output of pickup 144. At this position there is no voltage to energize the motor 163 and the motor stops rotating. The amount of movement necessary to bring the signal back into phase balance is thereby transmitted to the torque indicator 120. This indicator thereby gives a reading which is a function of the angular windup of the shaft 6 and thus an indication of the torque being transmitted to this shaft.

*Operation of Figure 6*

If the shaft 6 is first brought up to speed under no load conditions, the output signal produced by the combined effect of search coils 156 and 158 is in phase balance with that produced by the pickup 144. Under these conditions the torque indicator 120 indicates no torque. As torque is applied to the shaft 6 there is a phase displacement from the balance condition between the two signals introduced into the phase discriminator and an output signal is produced causing the motor 163 to rotate. The motor continues to rotate until the search coils 156 and 158 produce a signal that is in phase balance with that produced by 144. The amount of movement necessary to bring the two signals back into phase balance is indicated on 120 and thus the operator is able to determine the amount of windup of the shaft 6 and hence the amount of torque being transmitted.

It is to be understood also that although the invention has been described with specific reference to a particular embodiment thereof, it is not to be so limited, since changes and alterations therein may be made which are within the full intended scope of this invention as defined by the appended claims.

We claim:

1. A device for measuring the torque being transmitted from a power source to a load including, a flexible member between said power source and said load, two alternating current generators displaced from each other along said flexible member, one of said alternating current generators having a set of fixed pickup coils and the second of said alternating current generators having a plurality of sets of movable pickup coils, the output signal produced by one set of said movable pickup sets having a phase displacement from the output signal produced by said first mentioned generator that is a function of the torque being transmitted under load conditions, the output signal produced by another set of said movable pickup sets having a phase which is substantially the same as said signal produced by said first mentioned set of movable pickup sets, means including a phase discriminator for combining the signals produced by said first mentioned set of movable pickup sets and said first mentioned generator to produce a first voltage under torque conditions, means for combining the signals produced by said plurality of movable coil sets through said discriminator to produce a second voltage under torque conditions, and means for indicating the respective magnitudes of said voltages whereby any deviation from the true torque being transmitted can be determined.

2. A device for measuring the transmission of torque between a power source and a load including, a flexible member between said power source and said load, means for generating three alternating current signals, two of said signals having a phase displacement from each other that is a direct function of the torque being transmitted, said means including three sets of pickup coils located in spaced planes along said flexible member, one of said coil sets spatially fixed and two of said coil sets movable tangentially about the axis of said flexible member, means including a phase discriminator for combining the signals of said fixed coil set and one of said movable coil sets to produce a first voltage under torque conditions, means for combining the signals of said two movable coil sets through said phase discriminator to produce a second voltage under torque conditions, a motor responsive to said first voltage for moving said first mentioned movable coil set tangentially by an amount proportional to the amount of torsional flexure of said flexible member, said motor also being responsive to said second voltage for returning said first mentioned movable coil set to substantially its original position, and means associated with said motor for indicating the magnitude of movement of said first mentioned movable coil set in response to said first voltage to thereby indicate the torque being transmitted by said flexible member, said last mentioned means also indicating the magnitude of return movement of said first mentioned movable coil set in response to said second voltage whereby any deviation from the true torque being transmitted can be determined.

3. A device for measuring the torque transmitted from a power source to a load including, a rotating member having predetermined torsional stress strain characteristics included between said power source and load, two alternating current generators located in spaced planes along said rotating member, one of said alternating current generators having means for generating two output signals that are displaced from each other by a phase angle of ninety degrees, means for so connecting said two alternating current generators that their outputs are in phase balance under conditions of zero torque and are displaced in phase due to the torsional flexure of said first mentioned member, means for combining the two output signals of said first mentioned generator to produce a first combined signal, means for combining said first combined signal and the output signal of said second generator to produce a second combined signal proportional to a function of the phase displacement of said output signals, means for shifting the phase of said first combined output signal, means for utilizing said second combined signal for actuating said phase shifting means so that said first combined signal is in phase balance with the output signal of said second generator to thereby determine the torsional flexure of said first mentioned member and indicate the magnitude of the torque being transmitted between said power source and said load.

4. A device for measuring the torque being transmitted from a power source to a load including, a flexible member between said power source and said load, two gears having an equal number of teeth displaced from each other along said flexible member, one of said gears having two pickup coils located adjacent thereto and displaced from each other by a phase angle of ninety electrical degrees and said second gear having one pickup coil located adjacent thereto, means for so connecting said pickup coils that their outputs are in phase balance under conditions of zero torque and are displaced in phase due to the torsional flexure of said flexible member, means for combining the output signals of said first mentioned two pickup coils to produce a first combined signal, means for combining said first combined signal and the output signal produced by said one pickup coil of said second gear to produce a second combined signal proportional to the phase displacement of said output signals, means for shifting the phase of said first combined signal in response to said second combined signal so that said first combined signal is in phase balance with said output signal produced by said one pickup coil of said second gear and means to indicate the magnitude of the torque being transmitted between said power source and said load as determined by the torsional flexure of said flexible member.

References Cited in the file of this patent

UNITED STATES PATENTS

| Number | Name | Date |
| --- | --- | --- |
| 1,685,964 | Smith et al. | Oct. 2, 1928 |
| 2,180,169 | Ryan | Nov. 14, 1939 |

OTHER REFERENCES

Publication entitled "Strain Gages" in Electronics, Dec. 1943, pages 106–111 and 192.